J. GRANZ.
MECHANISM FOR THE TRANSMISSION OF MOVEMENTS.
APPLICATION FILED MAY 28, 1913.

1,118,411.

Patented Nov. 24, 1914.
2 SHEETS—SHEET 1.

Witnesses:

Inventor:

UNITED STATES PATENT OFFICE.

JOSEF GRANZ, OF PLAUEN, GERMANY.

MECHANISM FOR THE TRANSMISSION OF MOVEMENTS.

1,118,411.  Specification of Letters Patent.  Patented Nov. 24, 1914.

Application filed May 28, 1913. Serial No. 770,412.

*To all whom it may concern:*

Be it known that I, JOSEF GRANZ, a subject of the German Emperor, residing at Plauen, Vogtland, in the Kingdom of Saxony and Empire of Germany, have invented certain new and useful Improvements in Mechanism for the Transmission of Movements, of which the following is a specification.

The subject matter of my invention has reference to a device or mechanism for the transmission of various different movements to any other mechanism or mechanisms.

Figure 1:
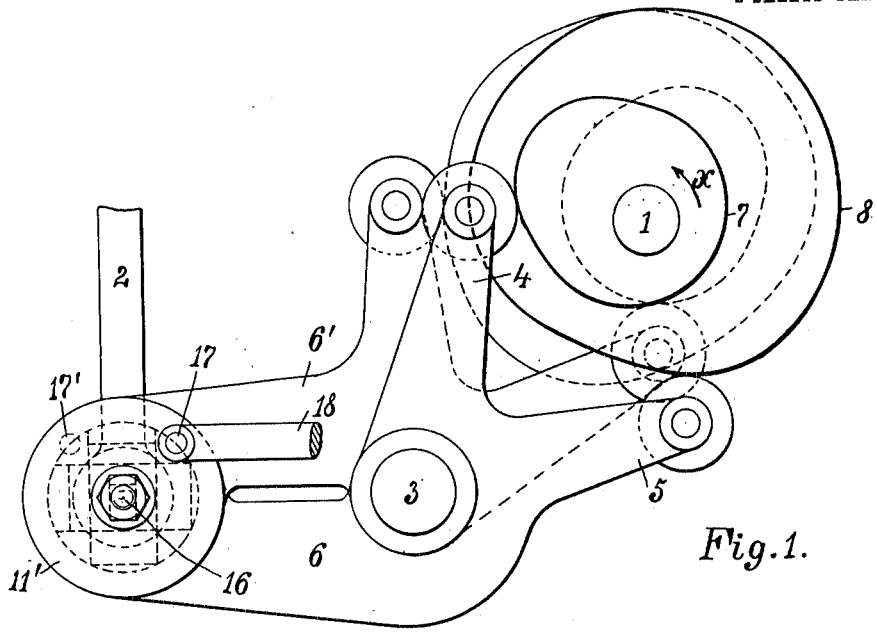
Figure 2:
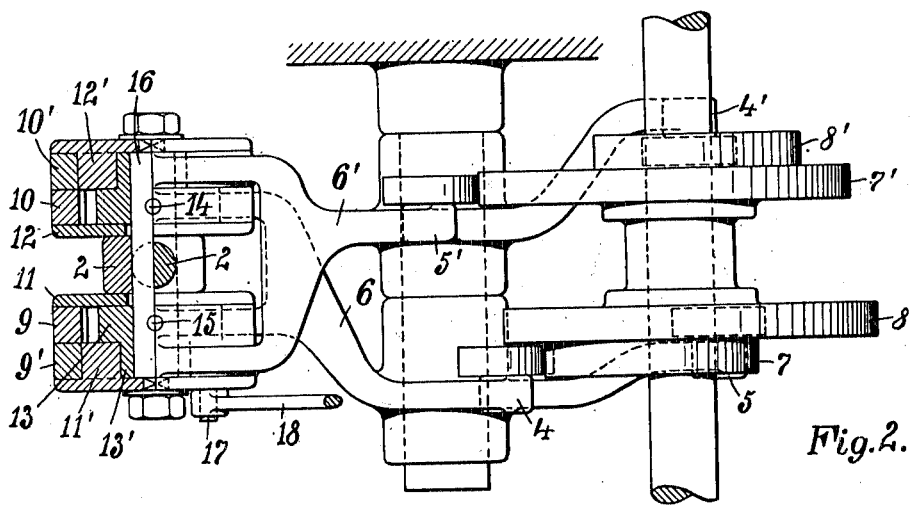
Figure 3:
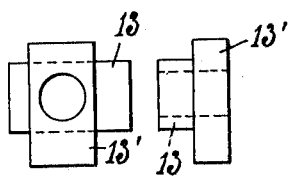
Figure 4:
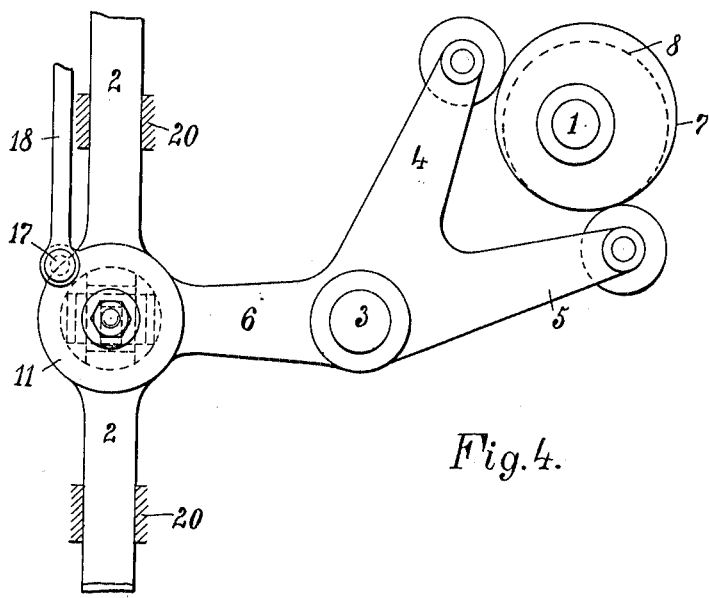
Figure 5:
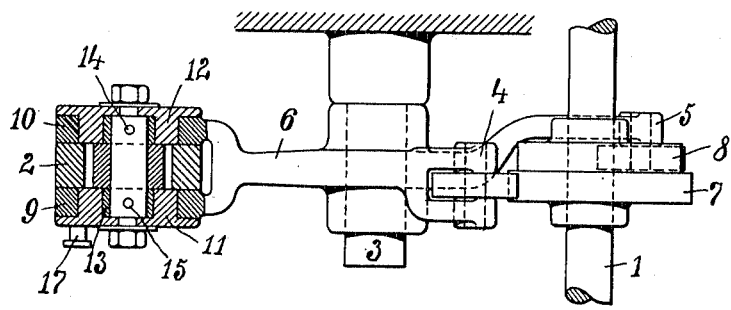

In the accompanying drawings I have shown two constructional examples of my invention, merely with a view to explaining its application. Of these two examples one is shown in Figures 1 to 3, while the other is represented by Figs. 4 and 5. Of these figures Fig. 1 is a lateral elevation while Fig. 2 is a horizontal section of Fig. 1; Fig. 3 shows a front and lateral elevation of an individual portion of the mechanism shown in Figs. 1 and 2; Fig. 4 is a lateral elevation, and finally Fig. 5 is a horizontal section of Fig. 4.

The mechanism in question is operated by means of the shaft 1, which rotates continually in the direction indicated by the arrow. The rod 2 is moved vertically up and down by means of the mechanism. To the stationary axle 3 two systems of levers are attached suchwise that they are able to rotate, the one system consisting of three arms 4, 5, 6 and the other of three similar arms 4', 5', 6', each of the levers 4, 5 and 4', 5' has a rotatable roller at its extremity. Now the roller of the lever 4 comes in contact with the periphery of the disk 7, while the roller of lever 5 engages with the disk 8. The roller of lever 4' comes in contact with the periphery of disk 7', while the corresponding roller 5' bears against the disk 8'. All these four disks are rigidly fastened to the shaft 1. The periphery of the two disks 7 and 8 is in each case of such dimensions that the rollers of the two levers 4, 5 are continually compelled to come in contact with the disks. The same arrangement prevails in the case of the disks 7' and 8'. The disk 7, however, is fashioned differently to the disk 7' and, consequently, the lever system 4, 5, 6 will perform movements which differ from those of the system of levers 4', 5', 6'.

Now the essential aim and object of my invention is to impart to the rod 2, according as may be required, at one time a movement adapted to correspond to the shape of the pair of disks 7, 8 and, at the other time to that of the pair of disks 7', 8'.

The end of the lever 6 carries two circular rings 9 and 10, while two rings 9' 10' are also arranged at the extremity of the lever 6'. In the ring 9' there is inserted a cylindrical disk 11', which is adapted to rotate within the said ring; a similar disk 11 is also inserted within the said ring 9, while the rotatable disks 12 and 12' are inserted within the rings 10 and 10' respectively. All these four disks 11, 12 and 11', 12' are in each case provided with a diametrical slot, in the slot of the disks 11' there is inserted the prismatic body 13', while a similar prismatic body 13 lies within the disk 11. The two prisms 13 and 13' form one single part or body and are disposed in the form of a right angle in relation to each other, as may be clearly seen on reference to Fig. 3. All these four prisms are rigidly connected to the common bolt 16 by means of the transverse pins or pivots 14, 15. On the outer surface of the disk 11' there is provided a pin 17, with which the end of the rod 18 engages in suchwise that it is capable of rotation. Consequently if the rod 18 be moved in a longitudinal direction whereby the pin 17 be caused to arrive at 17', to give an example, then a rotary movement will be imparted to the bolt 16 together with all the parts thereunto attached. If, for example the rotation amounts to a right angle or 90°, then the prism 13' will acquire a horizontal position, while prism 13 will move into a vertical position. It is never necessary that the rotations should exceed 90°, but it may be made smaller according to requirement. The end of the rod 2 is mounted in suchwise as to rotate between the two disks 11 and 12; the rod 2, namely, is provided with a round hole through which the bolt 16 passes.

The method of operation of the mechanism hereinbefore described is as follows. If the shaft 1 be rotated then the two systems of levers will be caused to make oscillatory movements around the shaft 3. These said movements, however, will differ from each other because the curved disks 7 and 7' are fashioned differently. If the disks 11, 12 be set or adjusted, in the manner shown in Figs. 1 2 3, then the rod 2 will follow the movements of the lever system 4, 5, 6. If the disks 11, 12 are rotated to the extent of 90°, by means of the rod 18, then the rod will follow the movements of the lever system, 4, 5, 6; if, on the contrary, the disks 11 and 12 be moved, by means of the rod 18, only in an angle of less than 90° (say 45° by way of example), then the rod 2 will acquire such compound movements as correspond in part to the lever system 4, 5, 6 and in part to the other lever system 4', 5', 6'.

A simpler method of carrying out the present invention is shown in Figs. 4, 5, wherein there is only one system of levers 4, 5, 6. In this form the rod 2 is guided in the bearings 20 in suchwise that it is only capable of performing straight vertical movements. If the prism 13 be so adjusted as shown in Figs. 4, 5, then the rod 2 will follow the movements of the lever system 4, 5, 6. If, however, the disks 11, 12 be rotated to the extent of 90°, by means of the rod 18, then the rod 2 will remain stationary.

What I claim as new, and desire to secure by Letters Patent, is as follows:

1. Mechanism for the transmission of different movements to another mechanism, comprising two prismatic bodies which form one single piece and which are disposed at a right angle in relation to each other, and rotatable disks in which said prismatic bodies are embedded and which perform movements entirely different each from the other.

2. In mechanism for the transmission of different movements to another mechanism, two prismatic bodies disposed at a right angle to each other and firmly secured together, rotatable disks, said prismatic bodies being embedded in said rotatable disks, one of which performs movements different from that of the other, a rod, said disks being articulated to said rod, to rotate said disks and said prismatic bodies, so as to bring them into such a position that the desired transmission of movement will be effected.

In testimony whereof I affix my signature in presence of two witnesses.

JOSEF GRANZ.

Witneses:
ROBERT H. NISR,
JOSEPH MIEHLE.